S. B. LJUTICA.
FOOD MOLD.
APPLICATION FILED OCT. 20, 1910.
987,470.
Patented Mar. 21, 1911.
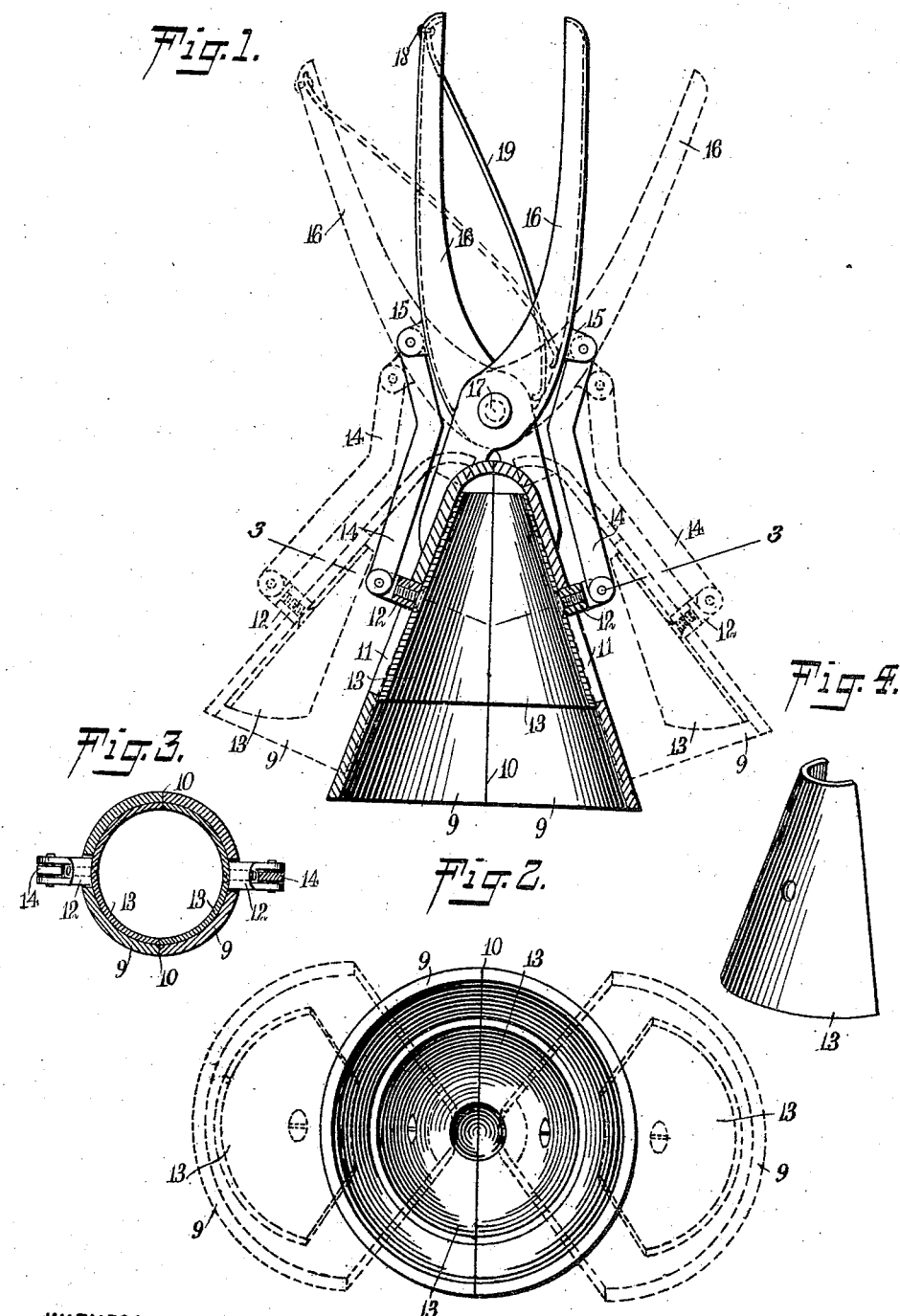
WITNESSES:
William P. Goebel
INVENTOR
Savo B. Ljutica
BY
ATTORNEYS.

UNITED STATES PATENT OFFICE.

SAVO BOSKOV LJUTICA, OF PORTLAND, OREGON.

FOOD-MOLD.

987,470.  Specification of Letters Patent.  Patented Mar. 21, 1911.

Application filed October 20, 1910. Serial No. 588,110.

*To all whom it may concern:*

Be it known that I, SAVO B. LJUTICA, a subject of the Prince of Montenegro, and a resident of Portland, in the county of Multnomah and State of Oregon, have invented a new and Improved Food-Mold, of which the following is a full, clear, and exact description.

Among the principal objects which the present invention has in view are: to provide in a mold of the character mentioned, means for ejecting the article from the mold after the same has been shaped; to provide an apparatus for molding raw food preparatory to cooking the same, which is convenient, simple and efficient in operation; and to provide a mold of the character mentioned which is simple and durable, and economical in construction.

One embodiment of the present invention is disclosed in the structure illustrated in the accompanying drawings, in which like characters of reference denote corresponding parts in all the views, and in which—

Figure 1 is a vertical section taken on the median line of a mold constructed and arranged in accordance with the present invention, the dotted lines in said figure illustrating the open position of the mold; Fig. 2 is an end view looking into the body of the mold, and showing in dotted lines the open position of the mold when viewed from the same direction; Fig. 3 is a cross section of the mold, taken on the line 3—3 in Fig. 1; and Fig. 4 is a detail view in perspective, showing one of the stripping plates of the mold.

The mold shown in the accompanying drawings is employed for shaping such articles of food as croquettes and particularly chicken croquettes or other conical shaped preparations. For this purpose the mold is formed of two solid half sections 9, 9. The sections 9, 9, when joined on the parting line 10, form a graceful conical inner shape. While I have shown in the drawings the straight wall shape, it will be understood that this may be varied without altering the spirit of the present invention as long as the pitch of the walls provides for a proper delivery of the molded article.

The sections 9, 9 are provided about the median line of the said sections with vertically disposed slots 11, 11. The slots 11, 11 are provided to guide the studs 12, 12 which are rigidly mounted to the stripping plates 13, 13, and are pivotally connected to links 14, 14. The links 14, 14 are pivotally connected to ears 15, 15 set up from the handles 16, 16. The handles 16, 16 are pivotally connected by a pivot pin 17. The stripping plates 13, 13 are preferably formed of very thin metal, and are shaped to conform to the inner surface of the mold formed by the sections 9, 9. Between the handles 16, 16, and rigidly secured to one of the said handles by means of a rivet 18, is a flat spring 19. The operation of the spring 19 is to normally extend the handles 16, 16, as shown in dotted lines in Fig. 1 of the drawings.

In the position shown in dotted lines in Fig. 1 of the drawings it will be observed that the plates 13, 13 are extended to the delivery edge of the sections 9, 9. This is the normal position of the mold. When the apparatus is prepared for molding the operator grasps the handles 16, 16 and contracts the same to the position shown in full lines in the drawings. This closes the sections 9, 9 upon each other in the form shown in Fig. 1. By reason of the links 14, 14 connecting the studs 12, 12 and plates 13, 13 connected therewith, the said plates are drawn to the upper or smaller end of the mold, as shown in Fig. 1, and in which position the parting edges of the said plates closely abut. The operator using the apparatus inverts the same to receive the food products. The food products are placed in the cup formed by the mold sections 9, 9 and plates 13, 13, and are forced therein until they take form. The apparatus is then carried to the repository for the product and inverted, as, by way of example, upon a skillet or gridiron. In this position the handles 16, 16 are released, when the spring 19 operates to dispose the apparatus in the position shown in dotted lines in Fig. 1 of the drawings. As the sections 9, 9 and handles 16, 16 are parted to form the open position, the stripping plates 13, 13 are forced outward to the delivery edges of the sections 9, 9 by the links 14, 14, thus insuring the delivery of the molded article, and stripping the sides of the sections 9, 9.

Having thus described my invention, what I claim as new and desire to secure by Letters Patent is:—

1. A food mold, comprising a plurality of mold sections having slots vertically disposed therein; a plurality of stripping shields shaped to conform to the said mold sections and slidably mounted in said slots; a plurality of handle sections, one of which is connected to each of said mold sections; a pivot for said handle sections; and a plurality of link connections between each of said handles and one of said stripping shields.

2. A food mold, comprising a plurality of mold sections having slots vertically disposed therein; a plurality of stripping shields shaped to conform to the said mold sections and slidably mounted in said slots; a plurality of handle sections, one of which is connected to each of said mold sections; a pivot for said handle sections; a plurality of link connections between each of said handles and one of said stripping shields; and resilient means disposed between said handles for spreading the same.

In testimony whereof I have signed this specification in the presence of two subscribing witnesses.

SAVO BOSKOV LJUTICA.

Witnesses:
 ED. W. WALLINGTON,
 E. L. MESSNOE.

---

Copies of this patent may be obtained for five cents each, by addressing the "Commissioner of Patents, Washington, D. C."